United States Patent [19]
Vassiliou

[11] 3,920,080
[45] Nov. 18, 1975

[54] CHANGEABLE CHASSIS OF PLOUGH

[76] Inventor: Constantinos Nicolaou Vassiliou, 36 Kassandrou St., Thessaloniki, Greece

[22] Filed: Aug. 16, 1973

[21] Appl. No.: 388,855

Related U.S. Application Data

[63] Continuation of Ser. No. 164,267, July 20, 1971, abandoned.

[52] U.S. Cl. ............... 172/447; 172/647; 172/667; 172/615
[51] Int. Cl.² ............... A01B 59/043; A01B 65/00
[58] Field of Search .......... 172/685, 614, 615, 616, 172/647, 734, 741, 742, 446, 447, 634, 635, 667

[56] References Cited
UNITED STATES PATENTS

| | | | |
|---|---|---|---|
| 722,261 | 3/1903 | Stewart | 172/647 X |
| 1,547,291 | 7/1925 | Bechdholt | 172/647 |
| 3,613,800 | 10/1971 | Martin | 172/667 X |

FOREIGN PATENTS OR APPLICATIONS

| | | | |
|---|---|---|---|
| 578,973 | 7/1958 | Italy | 172/447 |
| 2,208,864 | 5/1960 | Austria | 172/447 |

*Primary Examiner*—Stephen C. Pellegrino
*Attorney, Agent, or Firm*—Peter G. Mack

[57] ABSTRACT

An apparatus for adjustably mounting a plurality of plow elements or the like, the apparatus having a body portion which includes a plurality of tool mounting means, each tool mounting means being pivotable about a vertical axis. An arm extends from each tool mounting means, and a connecting means, in the form of an elongated member, is connected to each arm at a point thereon which is spaced from the vertical axis of the associated tool mounting means. The body portion may be swingably moved and, when it is, the effective width of tool sweep is varied while, at the same time, each tool mounting means is pivoted about its vertical axis to maintain the same at the most effective working angle.

9 Claims, 6 Drawing Figures

CHANGEABLE CHASSIS OF PLOUGH

CROSS REFERENCE TO RELATED APPLICATION

This is a continuation of application Ser. No. 164,267 filed July 20, 1971, now abandoned.

BACKGROUND OF THE INVENTION

In the earth working arts, and particularly in the art of plowing, it is often the case that resistance of the earth to the earth working tools or plow elements will exceed the power or traction capabilities of the prime mover. In such instances, this problem is typically overcome by lifting or raising the plow elements or tools or by removing one or more of the plow elements or tools from the implement. Both solutions are unsatisfactory. The former provides for only a superficial cultivation or working of the earth and necessitates repeated passes over the same areas. The latter solution is an awkward and time consuming operation.

Typically, most known types of cultivating implements have tools which are fixed on a chassis. Thus, the sweep of the tilling tools is unchangeable. In some known implements, however, a very limited capacity for adjustment has been provided. Yet, in such cases, it has heretofore been necessary to disconnect the bases of the individual tilling tools and then place them at different positions. In other cases, it has heretofore been necessary to disconnect various elements of the chassis of the implement in order to obtain different tilling dimensions. Both types of implements require complex and awkward procedures to effect only very limited adjustment; also, it is certainly not convenient to effect adjustment of these implements in the field at the very moments when the cultivation requirements happen to change. In other words, it is not possible, with the devices of the prior art, to quickly and easily adjust the overall width of the tool sweep of a plurality of wording tools according to the traction or power capabilities of the prime mover and/or according to the resistance of the soil.

SUMMARY OF THE INVENTION

The present invention overcomes the foregoing difficulties by providing an apparatus for adjustably mounting a plurality of plow elements or the like, wherein the width of the working path, that is, the width of sweep, may be readily varied. This is accomplished through a mechanical arrangement whereby a plurality of interconnected members may be pivotally moved relative to one another, while also remaining in a mutually parallel relationship. The plow elements or the like, which are mounted on the foregoing parallel mechanical device, are moved either closer together or farther apart when the parallel mechanical device is moved. The parallel mechanical device effects a change in the width of tool sweep while always maintaining the individual tools at the same cutting angle relative to the direction of travel.

Thus, the mounting apparatus of the present invention may be adjusted to provide the optimum spacing between plow elements or the like for various different earth working applications or soil tilling requirements.

Where the working resistance increases, as by increased density or hardness of the soil or an upward grade in the land, or where the power or traction of the prime mover has been reduced, as by wear of the tires or by wear of the mechanical components, this may be compensated for in the apparatus of the invention by adjusting the apparatus to provide a narrower tillage path or tool sweep. Likewise, the tool sweep may be widened when the power or traction increases or when the working resistance decreases.

The foregoing flexibility is achieved in the present invention by an apparatus having a body portion which includes a plurality of plow or tool mounting means, each mounting means being pivotable about a vertical axis. An arm extends from each tool mounting means, and a connecting means, in the form of an elongated member, is connected to each arm at a point thereon which is spaced from the vertical axis of the associated tool mounting means. The body portion may be swingably moved and, when it is, the effective width of tool sweep is varied while, at the same time, each tool mounting means is pivoted about its vertical axis to maintain the same at the most effective working angle.

DETAILED DESCRIPTION OF THE PREFERRED EMBODIMENT

Figure 1:
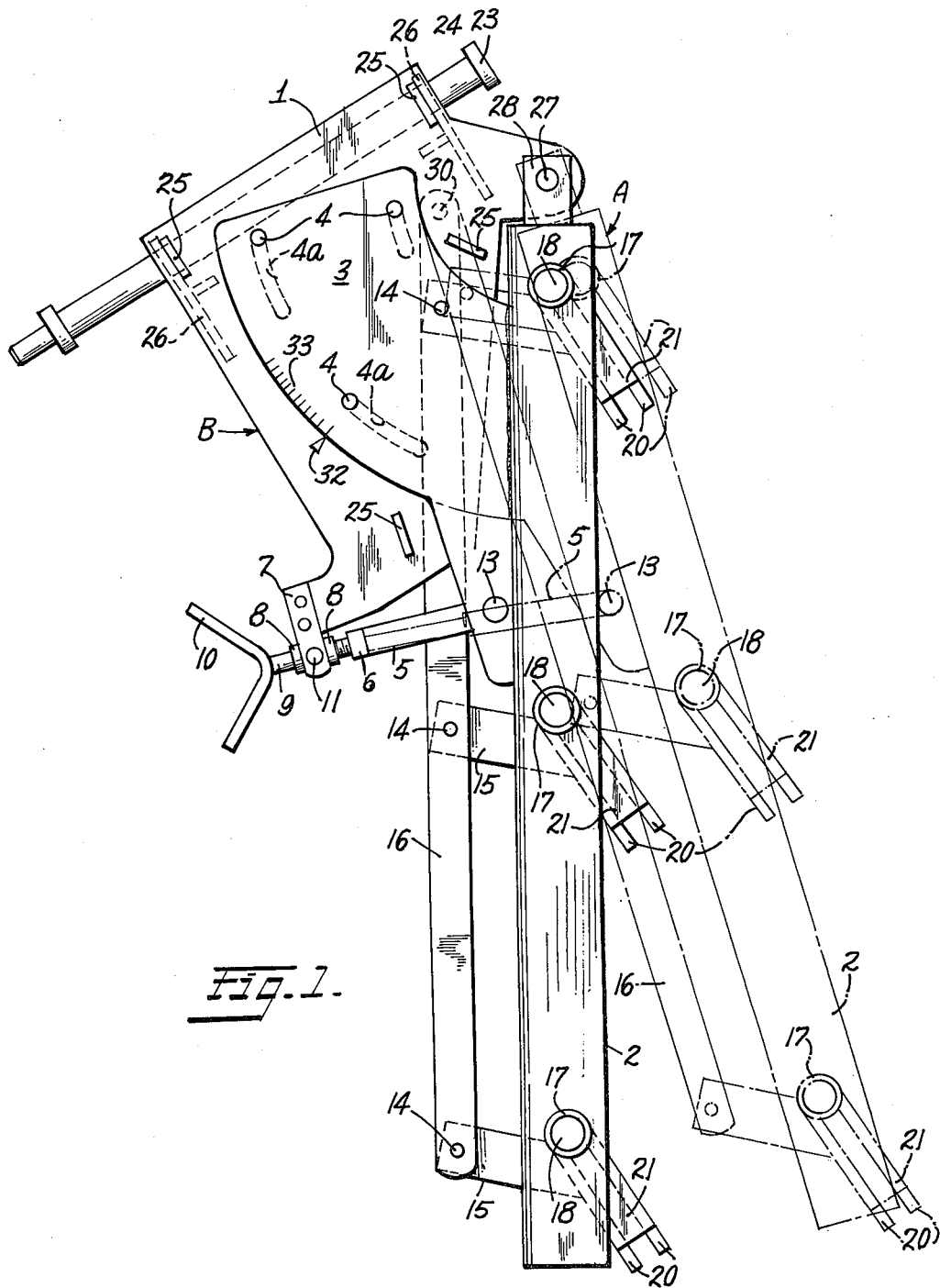
FIG. 1 is a plan view showing, in full lines, the apparatus of the invention with certain elements disposed in one end position, and showing, in phantom lines, the same elements in the opposite end position.

In the following description, and in the drawings, it is to be understood that like reference characters, when used in connection with different figures, refer to like elements or features.

Referring to the drawings, reference character A generally designates the main body portion of the apparatus of the invention. Reference character B generally designates a a support means on which the main body portion is swingably mounted. The principal structural element of the support means B is a flat support plate 1. In the main body portion A, the principal structural element is an elongated beam 2, which is hollow, as is apparent from FIGS. 3 and 4.

Figure 3:
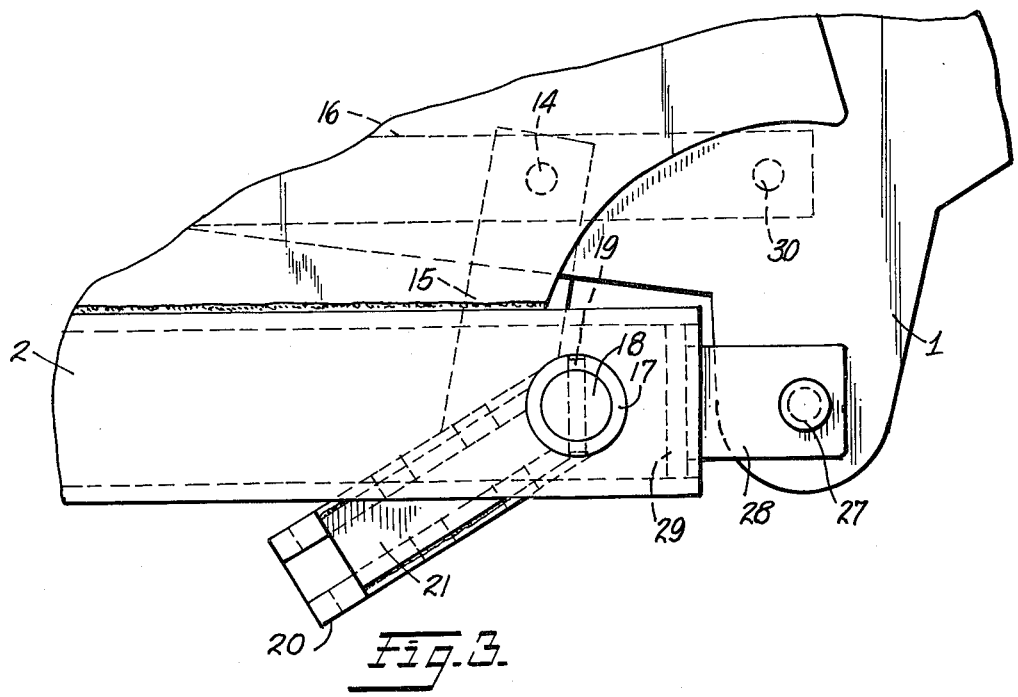
FIG. 3 is an enlarged fragmentary plan view of a specific area of the apparatus shown in FIG. 1.

The main body portion A includes an extension plate 3 attached to the elongated beam 2. Preferably, the extension plate 3 is welded to the elongated beam 2 as seen in FIG. 3. As will be apparent from FIGS. 1 and 3, the extension plate 3 is disposed in face-to-face relationship with respect to the support plate 1. It is clear from FIG. 1 that the extension plate 3 has a substantial surface area. FIG. 1 also makes it apparent that when the body portion A is disposed in the angular end position (with respect to the support means B) illustrated by solid lines, the extension plate 3 will then cover the major surface area of the support plate 1. The fact that the extension plate 3 is of substantial area enables the support plate to provide solid support and stabilization of the entire main body portion A relative to the support means B.

In this regard, it will be apparent from FIG. 1 that when the body portion is in the angular position shown by solid lines, the widest plowing path or tool sweep will be obtained. Of course, the forces developed on the main body portion are likely to be at a maximum when the working path is the widest. Accordingly, it is under just such conditions that the maximum surface area of the extension plate 3 is in face-to-face engagement with the support plate 1 to provide maximum stabilization.

As may be seen from FIG. 1, the support plate 1 and extension plate 3 include a plurality of spaced retaining means therebetween. Each retaining means includes a fastener 4, which is preferably connected with the extension plate 3, and a curved slot 4a, which is preferably formed in the support plate 1. Each of the fasteners 4 cooperates with one of the curved slots 4a in such fashion that tightening of the fastener 4 secures the extension plate 3 (and thus the entire main body portion) in a given angular position relative to the support plate 1. Of course, when the fasteners are loosened, the retaining action thereof is released and the extension plate 3 may be swingably moved relative to the support plate 1.

The apparatus of the invention includes a mechanical means for swingably moving the main body portion A relative to the support means B. In the illustrated embodiment, this mechanical moving means includes an adjusting bolt housing 5 which is connected with the extension plate 3 of the main body portion A. Also included is an internally threaded collar 6 and a bracket 7 extending from the support plate 1. A pair of rings 8 are fixedly connected to a main adjusting screw 9 to retain the adjusting screw within the bracket 7.

Figure 5:
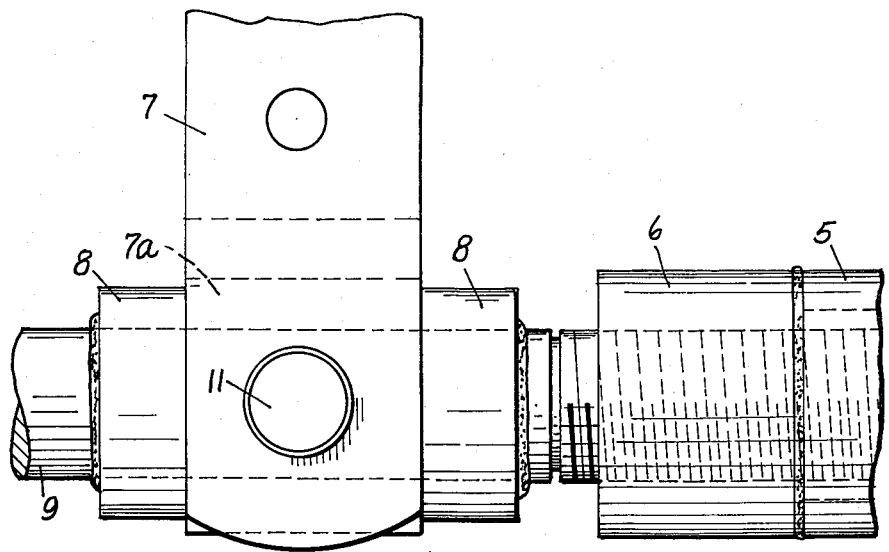
FIG. 5 is an enlarged fragmentary plan view of another specific area of the apparatus shown in FIG. 1.
Figure 6:
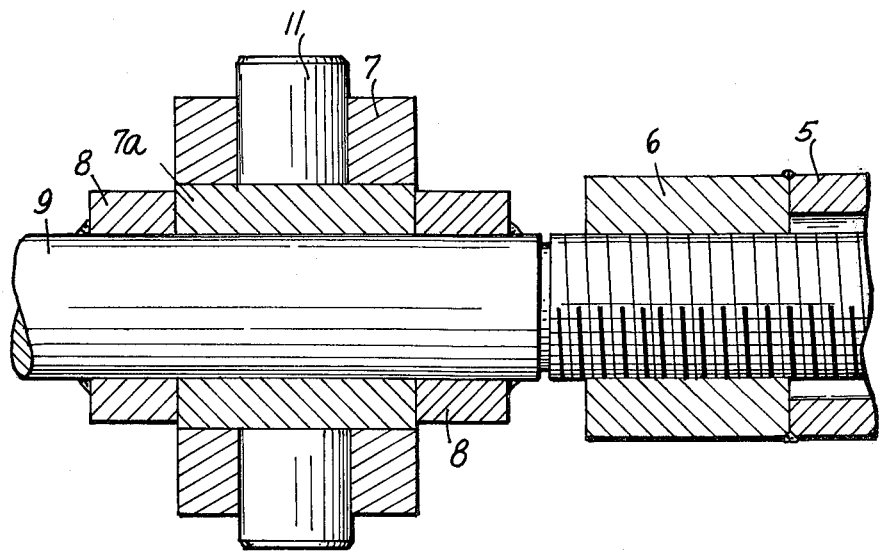
FIG. 6 is an enlarged fragmentary elevational view, partly in section, of the same area of the apparatus illustrated in FIG. 5.

The foregoing details of construction are best illustrated by FIGS. 5 and 6. As seen there, the adjusting screw 9 rotatably passes through the bracket 7 and bushing 7a thereof to threadably engage the collar 6 of the housing 5. This arrangement provides for linear extension of the overall mechanical moving means when the adjusting screw 9 is rotated by the handle 10 (FIG. 1). This rotation will cause the adjusting screw 9 to telescopically move into or out from the housing 5, by virtue of tis threaded engagement with the collar 6.

It is to be noted that the adjusting screw 9 is held in position on the bracket by the joint member 11. Also, it is to be noted that the housing 5 of the moving means is secured to the main body portion A by a ring 13.

The elements of the main body portion A are so arranged that, upon swinging movement of the main body portion relative to the support means B, the structural elements for mounting the working tools will be gradually pivoted so as to always be maintained at the same working angle. The elements effecting this result include a plurality of joint means 14, each of which is disposed near one end of an arm 15. Each joint means 14 serves to connect each arm 15 with a connecting means in the form of a single elongated member 16.

Figure 2:
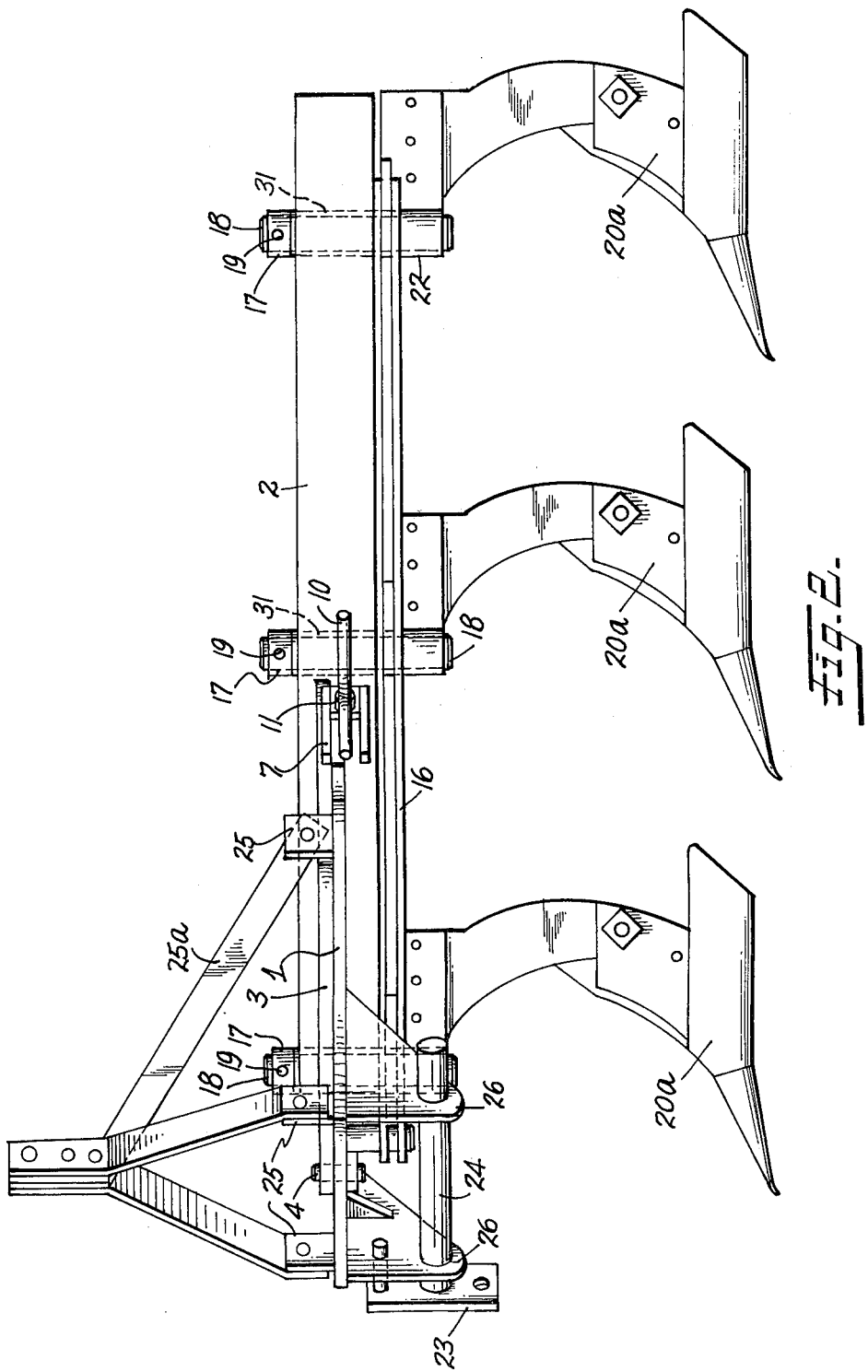
FIG. 2 is a side view, in perspective, of the apparatus of FIG. 1.

As will be described below, the foregoing elongated member, joint means and arms cooperate with a plurality of elements for pivotally mounting the working tools. These pivotal elements include a set of safety rings 17, each of which is fastened to one end of a vertical shaft 18 by a pin arrangement 19. A pair of spaced, tool mounting plates 20, each having an upper tool stabilizing plate 21 therebetween, are connected to each vertical shaft 18 by means of connecting rings 22. Above each of the tool stabilizing plates 21 are a set of triangularly shaped flanges 21a which add support to the above-described tool holding elements for relieving excessive stresses on each vertical shaft 18. Each of the pairs of tool mounting plates 20 has mounted therein an earth tilling tool, which, preferably, will be a plow element 20a as illustrated in FIG. 2.

Each vertically disposed shaft 18 is rotatable about its longitudinal axis within a sleeve 31. Each sleeve 31 is vertically disposed in the elongated beam 2 to provide an opening therethrough. Each shaft 18 is held within one of the vertical sleeves 31 by one of the aforementioned safety rings 17. Rotation of each shaft 18 about its vertical axis effects pivotal movement of each pair of tool mounting plates 20. In the illustrated embodiment, each shaft 18, sleeve 31, pair of tool holding plates 20 and other aforementioned elements associated therewith combine to form a single pivotable tool mounting means. As may be seen in FIGS. 1 and 2, the preferred embodiment includes 3 separate tool mounting means spaced along the length of the elongated beam 2 of the main body portion A. It will be clear from these figures that the individual tool mounting means should preferably be spaced apart as far as practicable to obtain the best results. Thus, a first tool mounting means is disposed adjacent one end of the elongated beam 2, a second is disposed adjacent the other end of the elongated beam 2 and the third is disposed approximately at the middle of the elongated beam. It is readily apparent that, to realize the objects and advantages of the invention, a plurality of tool mounting means must be used. It will also be clear that at least three separate tool mounting means should preferably be provided.

As shown in FIG. 1, an end plate 23 is attached to a cross shaft 24, the cross shaft being mounted on the support means B below the support plate 1 thereof. The end plate 23 serves to fixedly secure the cross shaft 24 in the fashion shown in FIG. 2. During operation, two arms of a conventional hydraulic lift mechanism of a tractor or other prime mover are attached to the cross shaft 24. A plurality of bases 25, which are disposed in spaced relationship on the upper surface of the support plate 1, secure an attachment structure 25a (see FIG. 2) to the support means B. During operation, a conventional third arm of a hydraulic lift mechanism of a tractor or the like is connected to the attachment structure 25a. Thus, by means of the cross shaft 24 and attachment structure 25a, the entire support means B is suspended from a conventional hydraulic lift means of a tractor or the like. In turn, the entire support means B serves as a mounting to which the complete main body portion A is swingably secured. It is to be noted that the cross shaft 24 is secured to the support means B by cross shaft seats 26 extending from the lower surface of the support plate 1.

As may be seen in FIG. 1, four separate bases 25, for mounting the attachment structure 25a, are disposed at different locations on the support plate 1. As described above, the extension plate 3 has a very substantial surface area relative to the surface area of the support plate 1. Nonetheless, the extension plate 3 must be capable of a significant swinging movement relative to the support plate 1 without interference with any of the several bases 25 disposed thereon. As will be apparent from FIG. 1, the capability for free swinging movement in this fashion is facilitated by a special configuration of the extension plate 3. Specifically, it will be seen that the extension plate 3 includes a pair of curved edges partially defining the perimeter thereof.

Figure 4:
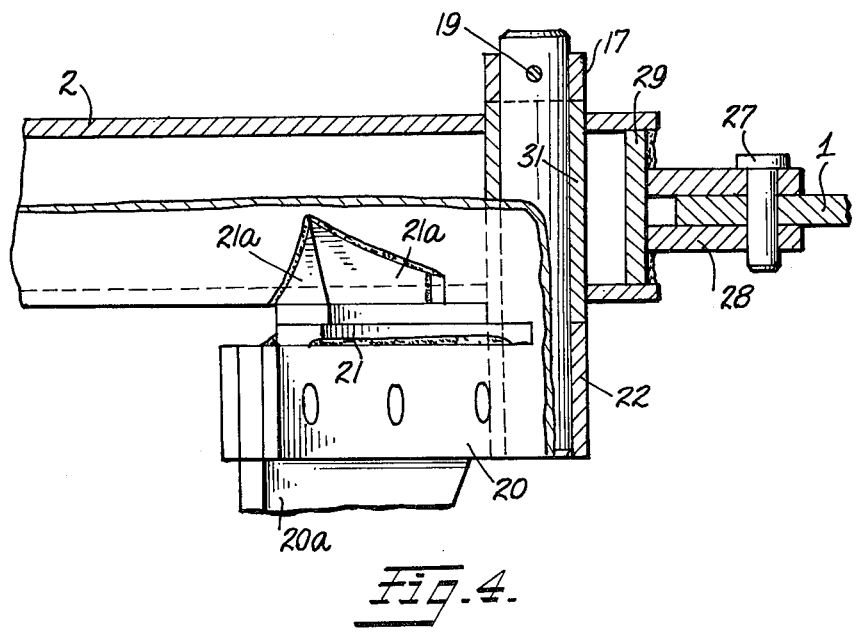
FIG. 4 is a fragmentary side elevation, partly in section, of the same area of the apparatus illustrated in FIG. 3.

As will be seen from FIGS. 1, 3 and 4, the elongated beam 2 of the main body portion A is pivotally connected to the support plate 1 by means of a pin 27 passing through a bracket 28 which is affixed, as by welding, to a washer 29. The washer 29, in turn, is welded to the interior of the hollow elongated beam 2. In addition, the elongated member 16, which is disposed parallel to the elongated beam 2, is pivotally connected to the underside of the support plate 1 by a connector 30.

As mentioned above, the elongated member 16 has three spaced apart arms 15 pivotally connected thereto. These arms, in turn, are each connected to one of the three tool mounting means, each tool mounting means including, in the illustrated embodiment, a pair of plates 20, a connecting ring 22, a shaft 18, etc. The tool mounting means, of course, are connected to the elongated beam 2. Thus, the elongated beam 2 and parallel elongated member 16 are effectively connected to one another. When the elongated beam 2 is pivotally displaced, as by rotation of the adjusting screw 9, the elongated member 16 moves along with the elongated beam 2 in parallel relationship thereto. This mutual, parallel pivoting effects a relative lengthwise displacement of the elongated member 16 with respect to the elongated beam 2. The relative displacement, in turn, causes each of the arms 15 to move pivotally about joints 14, and also causes each of the tool mounting means to move pivotally about the axis of each vertical shaft 18. Hence, when the adjusting screw 9 causes the elongated beam 2 to swing angularly, the several tool mounting means will pivot about their vertical axes. This automatic pivotal movement of the tool mounting means effects movement of the plow elements 20a, so that, regardless of the angular disposition of the beam 2, the plow elements will always be maintained at the same working angle relative to the direction of travel.

As will be obvious from the drawings, the direction of travel of the tractor or prime mover will be perpendicular to the cross shaft 24. As will also be obvious, the widest working path or tool sweep will be provided when the main body portion A is in the extreme angular position (relative to the support means B) illustrated by solid lines in FIG. 1. In this position, the main body portion A is at the maximum angle relative to the direction of travel thereby providing the maximum extent of traverse.

It is also apparent that when the main body portion A is swung, by rotation of the adjusting screw 9, into the angular position shown by phantom lines in FIG. 1, the narrowest cutting path or tool sweep will be provided. In this latter position, the main body portion A will be at a minimum angle with respect to the direction of travel, thereby providing the minimum extent of traverse. Typically, when the elongated beam 2 is disposed so as to provide the widest tool sweep, the width of the cutting path of each plow element 20a will be approximately 14 inches. When the elongated beam 2 is then swung into the angular position providing the narrowest tool sweep, the effective width of the cutting path of each tool element will be reduced to approximately 8 inches. This reduction in width is caused by overlap of the adjacent cutting paths of each tool element.

Of course, the main body portion A may be adjusted to any angular position between the two extremes just described. During operation, the optimum angular position is selected for the particular conditions which prevail. When the conditions change, the angular disposition of the body portion A, and thus the width of the tool sweep, may be readily varied, by rotation of adjusting screw 9, to meet the new conditions.

In order to apprise the operator of the precise angular position at which the body portion A is disposed at any given time and to facilitate accuracy in adjustment, an indicating means is provided between the aforementioned support and extension plates 1 and 3. The indicating means includes a pointer 32 which, preferably, is mounted on the support plate 1 and a set of indicia 33, preferably on the extension plate 3. The above-described relative movement between the support and extension plates will cause the indicia 33 to move relative to the pointer 32, indicating the angle at which the main body portion A is disposed with respect to the support means B.

While throughout the above description, words such as "vertical", "above", "below", "upper", "lower" and other relative terms have been used, it is to be understood that these terms are used only to describe relationships between elements and are not intended to be limiting. It will also be understood that those skilled in the art may make changes and modifications to the above-described preferred embodiment without departing from the spirit and scope of the invention.

What is claimed is:

1. An apparatus for adjustably mounting a plurality of earthworking tools comprising:
   a. a body portion;
   b. said body portion including a plurality of tool mounting means, each of which is pivotable about a vertical axis;
   c. each tool mounting means having an arm extending therefrom, each arm having a joint means disposed at a point thereon which is spaced from the vertical axis of the associated tool mounting means;
   d. means connecting each of said joint means, said connecting means being movable in generally parallel relationship with respect to said body portion;
   e. a support means adapted for attachment to a tractor, said connecting means being coupled with said support means;
   f. a pivot means between said support means and said body portion for swingably connecting said body portion to said support means;
   g. means, connected between said support means and said main body portion, for swingably moving said main body portion relative to said support means;
   h. whereby, upon swinging movement of said body portion, the effective width of tool sweep is varied and each of said tool mounting means is pivoted to maintain the tool mounting means at the same working angle regardless of the disposition of the body portion.

2. An apparatus as defined in claim 1, including a plow element mounted on each tool mounting means.

3. An apparatus as defined in claim 1, wherein said connecting means is a single elongated member.

4. An apparatus as defined in claim 1, wherein said moving means is a linearly extensible device.

5. An apparatus as defined in claim 1, wherein said body portion includes an extension plate attached thereto, said extension plate cooperating with said support means to stabilize said main body portion.

6. An apparatus as defined in claim 5, wherein said support and extension plates include a plurality of spaced retaining means associated therewith, each retaining means including a curved slot in one of said plates and a fastener attached to the other of said plates, each fastener cooperating with one slot to releasably secure said body portion in various angular positions relative to said support means.

7. An apparatus as defined in claim 5, wherein said support and extension plates have indicating means associated therewith said indicating means including a pointer on one of said plates and a set of indicia on the other of said plates.

8. An apparatus as defined in claim 5, including:

a. a plurality of spaced bases protruding from said support plate and an attachment structure secured to said bases;

b. a pair of curved edges on said extension plate partially defining the same.

9. An apparatus as defined in claim 5, wherein said body portion is swingable between a first end position wherein the widest tool sweep is provided and a second end position wherein the narrowest tool sweep is provided, said extension plate being of such size and disposition as to cover the major surface area of said support plate at least when said body portion is in said first end position.

* * * * *